United States Patent [19]

King

[11] Patent Number: 4,807,935

[45] Date of Patent: Feb. 28, 1989

[54] SEAT ARM REST ASSEMBLY

[75] Inventor: Shaylor E. King, Elkhart, Ind.

[73] Assignee: QMP, Inc., Elkhart, Ind.

[21] Appl. No.: 129,653

[22] Filed: Dec. 7, 1987

[51] Int. Cl.$^4$ .............................................. A47C 7/54
[52] U.S. Cl. .................................. 297/417; 248/291; 297/412
[58] Field of Search ....................... 297/417, 412, 411; 248/240, 242, 291, 558

[56] References Cited

U.S. PATENT DOCUMENTS

| 4,196,821 | 4/1980 | Teti, Jr. ........................... 248/291 X |
| 4,400,033 | 8/1983 | Pietsch ................................ 297/417 |
| 4,466,664 | 8/1984 | Kondou ............................... 248/291 |
| 4,668,010 | 5/1987 | Fujiwara ........................ 297/417 X |

Primary Examiner—James T. McCall
Attorney, Agent, or Firm—Thomas J. Dodd

[57] ABSTRACT

An arm rest for a vehicle seat which is rotatable from a horizontal to a generally vertical position, composed of virtually symmetrical components, permitting the interchange of assembly parts from left to right, thereby decreasing the number of parts necessary for assembly of a complete seat having left and right arm rests.

5 Claims, 2 Drawing Sheets

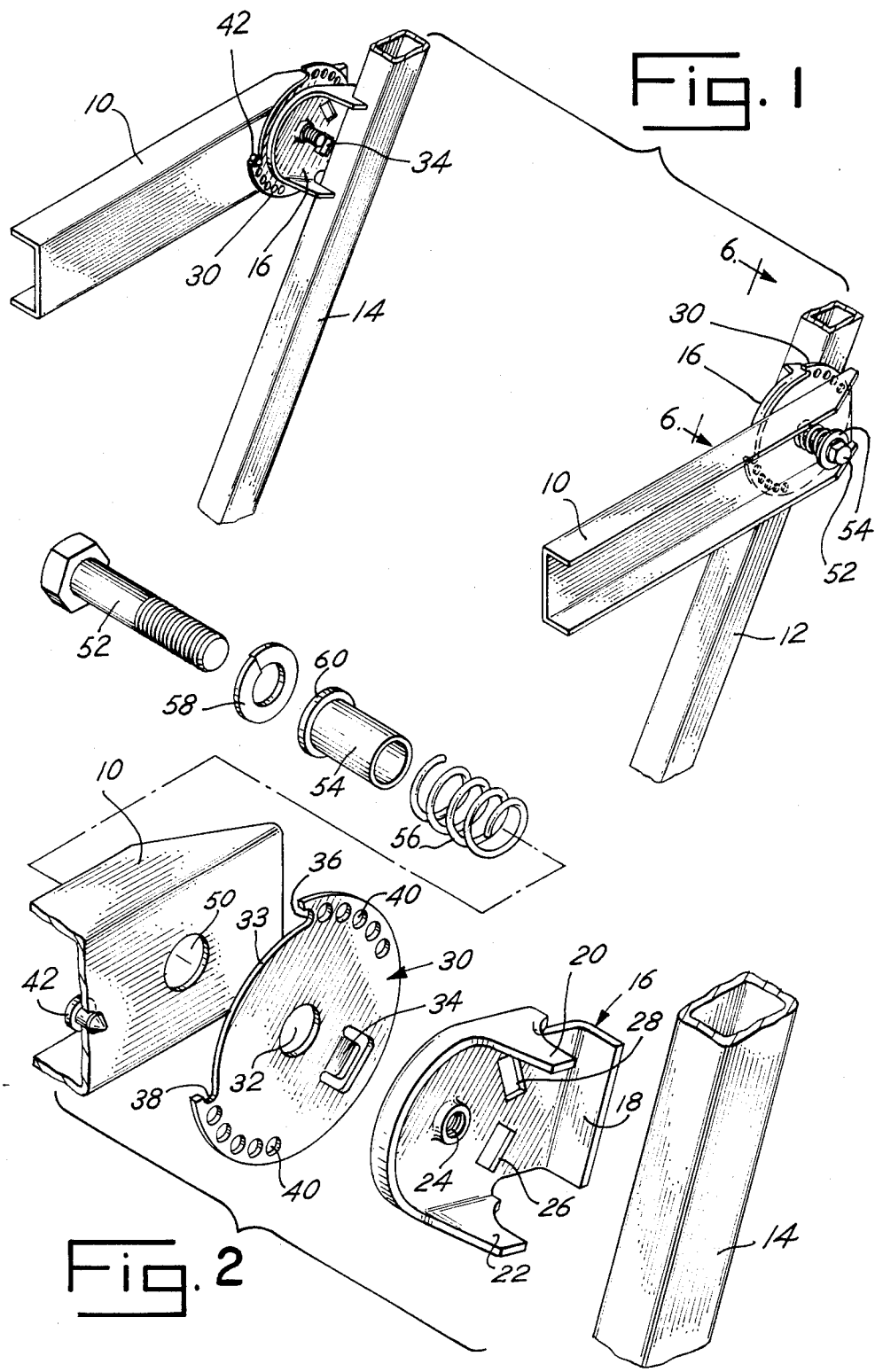

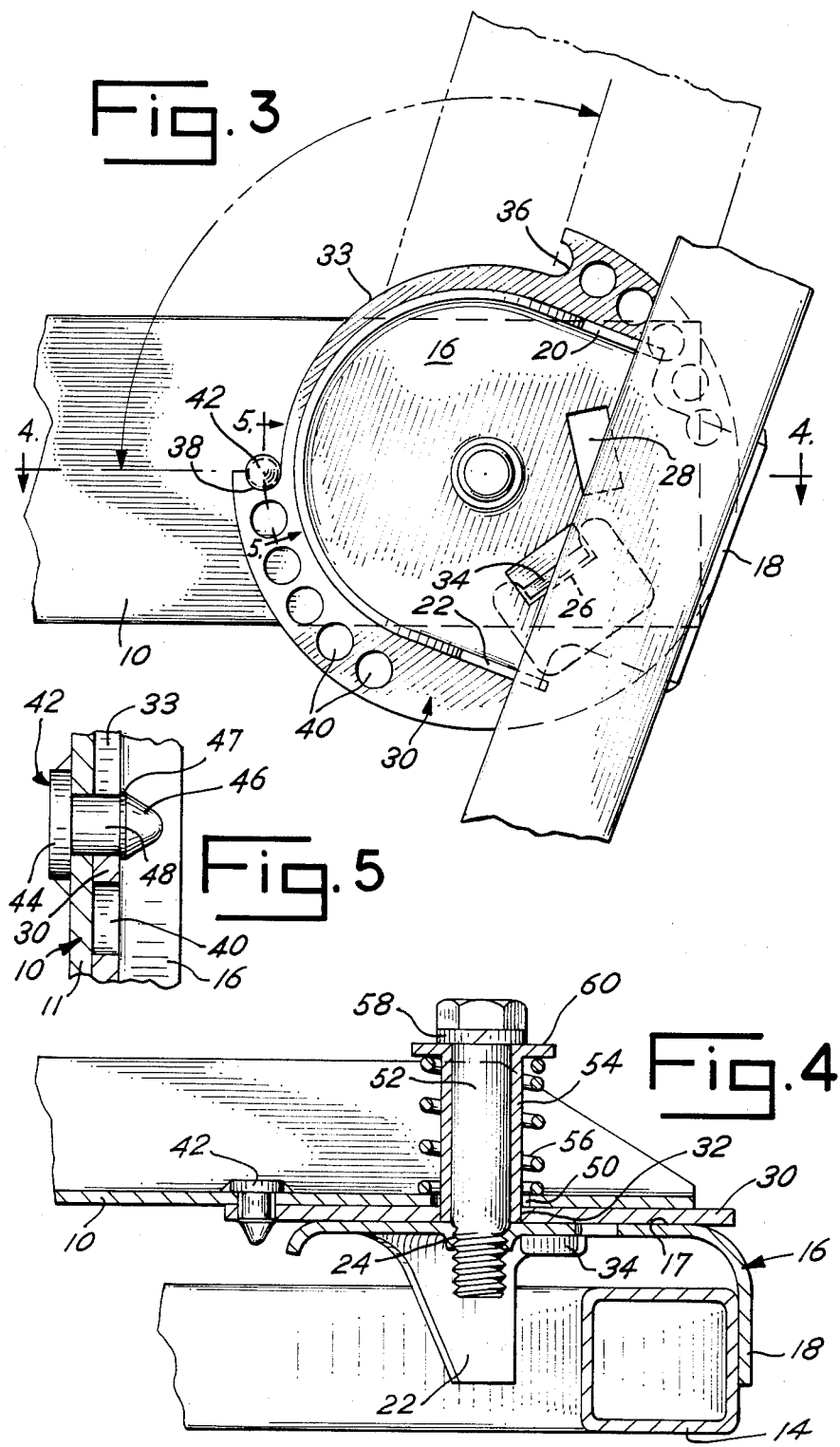

SEAT ARM REST ASSEMBLY

BACKGROUND OF THE INVENTION

This invention is directed to an improved adjustable arm rest and is particularly adaptable to arm rests found on seats in vehicles such as those generally referred to as recreational vehicles.

Due to the nature of the recreational vehicle or van, and unlike a standard automobile, the seats are generally independent of one another and somewhat self-contained, more of the "bucket" than the "bench" style. Additionally, a driver or passenger of a recreation vehicle normally steps up into or down out of such a vehicle, rather than sliding down into and up out of a seat in a standard automobile.

Such seats normally have arm rests on both sides, unlike automobiles. In order to facilitate movement in and about the vehicle, the arm rests are movable to a fully upright position where the arm rest is generally flush with the back of the seat from a down position at which they serve their normal function. Further, since the seats are adjustable to a variety of nonvertical positions, the arm rests must also be adjustable, in order to maintain their desired supportable position when in use.

A generally adequate arm rest configuration has evolved which satisfies all of the arm requirements. It has, however, one major shortcoming, in that there is always a left arm rest and a right arm rest. This necessitates separate inventory control, separate storage bins preparatory to assembly, the stocking of separate arm rests and confusion and wasted time in the actual assembly of the seats.

The present invention meets all of the requirements for the arm rest described above, and also provides a means for overcoming the disadvantages set forth. This invention is directed to an interchangeable arm rest which may be attached to either side of the seat and still achieve the required versatility and perform the necessary functions of such an arm rest without modification.

While this invention has been developed specifically for recreation vehicles, the obvious advantages will make it clear that its use is not so limited and that it will find wide use and acceptance in other environments such as buses, aircraft and boats as well as in specialty vehicles such as ambulances and the like.

SUMMARY OF THE INVENTION

The purpose of this invention is to create an arm rest which is designed so to serve interchangeably on either the left or right side of a seat without further physical modification.

The implementation of the purpose of the invention is achieved through the unique design of the locator plate and the mounting bracket of the arm rest. The mounting brackets are fixed, preferably by welding, to the seat-back channels on either side of the seat frame. Due to the design, the mounting brackets are identical in construction.

The locator plate is connected, by a spring-urged bushing and bolt, to the arm rest. The locator plate includes a tab which fits into one or the other of two openings in the mounting bracket to prevent rotation of the plate when the arm rest is rotated. If on the left side, the tab fits into one of the two openings and if on the right side, the tab fits into the other of the two openings. With this configuration, the arm rest, when attached to either the left or right side, function in such a manner as to be rotatable from an essential horizontal mode into an essentially vertical mode.

A locator pin is fixed to the arm rest to act as a stopper to prevent undesired movement, as will be explained in more detail later. A series of holes are found in the locator plate, which receive the locator pion, the details and purpose of which will also be explained later.

BRIEF DESCRIPTION OF THE DRAWINGS

FIG. 1 is a fragmentary diagrammatic view of the apparatus assembled on the seat-back channels of a seat frame.

FIG. 2 is an exploded perspective view of the apparatus and its component parts.

FIG. 3 is a fragmentary enlarged view of the apparatus shown in the left side of FIG. 1.

FIG. 4 is a sectional view of the apparatus taken along lines 4—4 of FIG. 3.

FIG. 5 is a sectional view of the locator pin taken along lines 5—5 of FIG. 3.

DESCRIPTION OF THE PREFERRED EMBODIMENT

Figure 6:
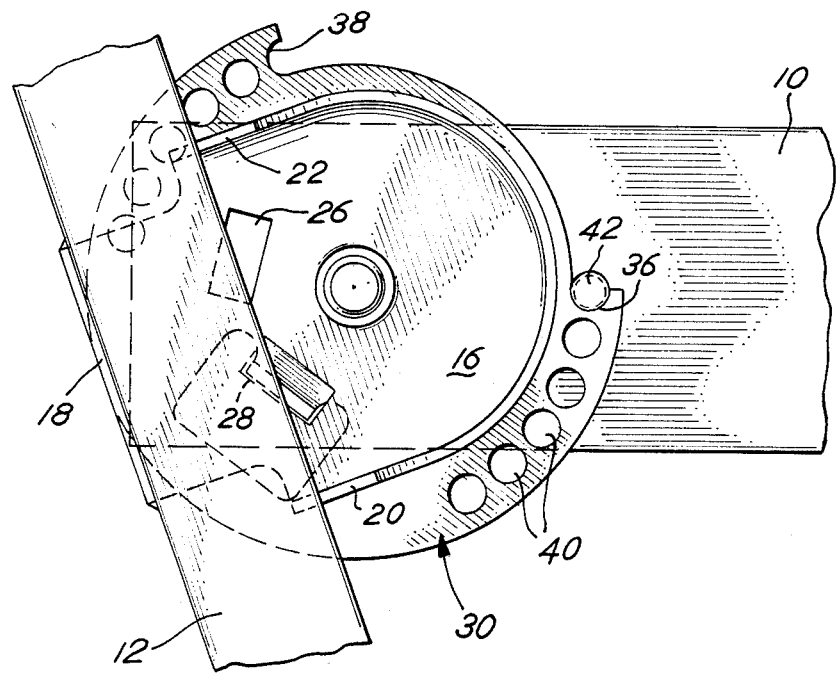
FIG. 6 is a fragmentary enlarged view of the apparatus shown in the right side of FIG. 1 as seen from line 6—6.

FIG. 1 is a diagrammatic illustration of the apparatus of this invention illustrated as mounted on and fixed to the side channels of the back portion of a seat. As they do not form a part of the invention, all other details of the seat have been deleted. All upholstery has also been removed from the seat and the arm rests to better illustrate the details of the invention. Both the left and right arm rests utilize the same parts.

Arm rest 10 is relatively straightforward, constituting a standard channel of sufficient strength to perform its function. The apparatus specific to the means for interchangeably attaching arm rest 10 to the seat is the crux of the invention.

Seat back channels 12, 14 are of standard design and form parts of the customary seat frame. Each mounting bracket 16 is formed of sheet metal or the like and is attached, preferably by welding, to a seat back channel 12, 14. The rearwrad portion 18 of each mounting bracket 16 is bent at a right angle so as to surround a portion of seat back channel 12, 14. Intermediate mounting bracket 16 are two legs 20, 22 extending at right angles and formed, in cooperation with rear portion 18, so to embrace seat back channel 12, 14. While the right arm rest is depicted in FIG. 2-4, it is to be understood that component parts of the apparatus are reversed in location in the left arm rest as seen in FIG. 6.

In the center of the forward rounded portion of each mounting bracket 16 is a threaded bore 24, the purpose of which will be explained later. Rearwardly, of bore 24, offset by approximately 30° and positioned generally longitudinally and radially to an imaginary circle drawn about bore 24, are two rectangular openings 26, 28.

Each locator plate 30 is of a generally circular configuration with a diameter approximately one inch greater than the face portion 17 of mounting bracket 16. Locator plate 30 has a central bore 32 and a tab 34 which extends from one face and is located so to mate with either of openings 26 or 28 in mounting bracket 16.

Opposite tab 34, a portion of the peripheral circumference of locator plate 30 is removed to define an annular slot 33 to accommodate locator pin 42 and to permit the rotational movement of arm rest 10 in a vertical plate. Each end 36, 38 of slot 33 is machined in the shape of a semi-circle, of a radius slightly in excess of the radius of locator pin 42 to act as a stop for the vertical rotation of arm rest 10 in its down or up mode.

Following along the circumference of locator plate 30 are a series of openings 40, preferably equally spaced apart and extending for a short distance around from each end 36, 38 of slot 33 in locator plate 30.

Arm rest 10 contains a bore 50 which matches bore 32 in locator plate 30 and bore 24 in mounting bracket 16. Bores 32 and 50 are not threaded and serve to accommodate a bolt 52 and a shouldered bushing 54. The assembly also includes a coil spring 56, the purpose of which will be fully explained.

An arm rest 10 is attached to seat back channel 14 in the following manner. A lock washer 58 is placed on bolt 52, followed by shouldered bushing 54 and coil spring 56. Coil spring 56 is made so to fit around bushing 54 and to abut its circumferential shoulder 60. Coil spring 56 is of a length in excess of the length of shoulder bushing 54 in order to urge arm rest 10 into compressive engagement with the adjacent locator plate 30 at its opposite face and mounting bracket 16.

Bolt 52, with washer 58, shouldered bushing 54 and coil spring 56, is inserted through bore 50 in arm rest 10, bore 32 in locator plate 30 and fixed to mounting bracket 16 by being turned into its theaded bore 24. It is important to note that tab 34 of locator plate 30 is inserted through opening 26 in mounting bracket 16 to properly orient the mounting bracket relative to seat back channel 14.

The diameter of bore 50 sufficiently exceeds the outside diameter of shoulder bushing 54, as best illustrated in FIG. 4, to allow a pivoted movement of arm rest 10 away from locator plate 30 and mounting bracket 16 with the contraction of spring 56 in order to withdraw locator pin 42 from the locating plate.

When bolt 52 is tightened as far as it will go into mounting bracket 16, shoulder bushing 54 is firmly pressed against mounting bracket 16 and coil spring 54 is compressed, urging arm rest 10 and locator plate 30 tightly against mounting bracket 16.

Mounted and fixed to arm rest 10 is previously identified locator pin 42, the details of which are illustrated in FIGS. 4 and 5. Locator pin 42 is attached, such as by welding, to arm rest 10 at its base 44 and, includes at its opposite end, a head 46. Head 46 is of a truncated conical shape. Shaft portion 48 of locator pin 42 is of a length slightly greater than the thickness of edge 11 of arm rest 10 plus the thickness of locator plate 30.

The base 47 of head 46, where is meets shaft 48, is greater in diameter than shaft 48. The diameters of holes 40 in locator plate 30 are slightly greater than the diameter of base 47. Likewise, the radius of ends 36, 38 of slot 33 in locator plate 30 is slightly greater than the radius of shaft 48 of locator pin 42. This is because when arm rest 10 is in its down position, locator pin 42 generally fits into end opening 38. Pin base 47 overlies the edge of the end opening and prevents an inadvertent lateral separation of the pin from the locator plate to keep the arm rest in place.

As with most vehicle seats, the back rest is adjustable. If locator pin 42 is rested against 38 when the seat back is adjusted rearwardly, the arm rest would assume a non-horizontal mode. In such a case, the operator merely presses arm rest 10 outwardly away from its position and rotates the arm rest forwardly and downwardly to a desired position. When the pressure is released, the locator pin 42 enters any one of the series of holes 40 in plate 30 and is thereby fixed in the position.

It will again be noted that the configuration and openings in locator plate 42 are symmetrically disposed. To assemble arm rest 10 on the left side as in FIG. 6, the same components are assembled as shown with tab 34 being inserted into rectangular opening 28 (rather than opening 26) which is now the bottom-most opening in mounting bracket 16. End 36 of slot 33 in locator pin 30 becomes the bottom-most end (rather than end 38) against which locator pin 42 abuts when arm rest 10 is in its horizontal position. Because of the symmetry of the parts of the assembly, all other functions previously described are performed in the same manner, whether the right arm rest or the left arm rest is used.

Those skilled in the art will appreciate that the invention described above is merely exemplary of the preferred embodiment, and that modifications can be made without departing from the spirit and scope of the invention as defined in the appended claims.

What is claimed is:

1. An arm rest assembly for a seat having a frame, said assembly including an arm rest rotatably moveable from a generally horizontal to a generally vertical position, said assembly composed of parts which are symmetrical and interchangeable from either left or right, said parts comprising a mounting bracket fixable to said seat fraome at either the right or left side thereof, a locator plate which is assemblable to said mounting bracket and which includes means to releasably mate therewith, said locator plate including a circumferential notch therein which defines a path of movement of said arm rest, said arm rest including a locator pin which is positioned so to cooperate with the slot in said locator plate in such a manner as to permit the arm rest to stop in its said generally horizontal and generally vertical positions, said locator plate further including a tab portion extending from one face of said plate, said mounting bracket including two openings located so as to mate with the tab portion of said locator plate, one of which mates when said mounting bracket is fixed to the left side of said seat frame and the other of which mates when said mounting bracket is fixed to the right side of said seat frame, and means to attach said arm rest to said mounting bracket with said locator plate located therebetween.

2. The arm rest assembly of claim 1 wherein said locator plate includes a series of spaced apart holes of a size to accept said locator pin, said locator pin including a head means for preventing unintentional withdrawal of said locator pin from one of said holes or notch after it has been inserted therein.

3. An arm rest assembly in combination with a seat frame, said arm rest assembly being composed of parts which are symmetrical and interchangeable from either left or right, said combination comprising a mounting bracket secured to either the left or right side of said seat frame, a locator plate overlying said mounting bracket and including a projecting part engaging said mounting bracket at one of two locations to selectively orient the locator plate relative to the mounting backet depending upon which said side of the seat frame the bracket is secured, an arm rest rotatably moveable in a general plane from a generally horizontal to a generally vertical position and overlying said locator plate, said arm rest carrying stop means engageable with the locator plate for limiting movement of the arm rest at said horizontal and vertical positions, and a pivot connection securing said arm rest and locator to said mounting bracket to allow movement of the arm rest between said horizontal and vertical positions relative to the locator part.

4. An arm rest assembly in combination with a seat frame, said arm rest assembly being composed of parts which are symmetrical and interchangeable from either left or right; said combination comprising a mounting bracket secured to either the left or right side of said seat frame, a locator plate overlying said mounting bracket and including a part engaging said mounting bracket at one of two locations to selectively orient the locator plate relative to the mounting bracket depending upon which said side of the seat frame the bracket is secured, an arm rest rotatably moveable in a general plane from a generally horizontal to a generally vertical position and overlying said locator plate, said arm rest carrying stop means engageable with the locator plate for limiting movement of the arm rest at said horizontal and vertical positions, and a pivot connection securing said arm rest and locator plate to said mounting bracket to allow movement of the arm part between said horizontal and vertical positions relative to the locator part, said pivot connection including means for permitting lateral movement of said arm rest out of said general plane of arm movement to disengage the stop means from said locator plate, said stop means including a pin including a shouldered part constituting means from engaging said locator plate to prevent said arm rest lateral movement without movement of the arm rest first in its said general plane.

5. The combination of claim 4 wherein said locator plate includes spaced open portions, said shouldered part engageable with said locator plate at a selected one of said open portions.

* * * * *